(12) United States Patent
Navarro et al.

(10) Patent No.: US 9,068,036 B2
(45) Date of Patent: *Jun. 30, 2015

(54) PROCESS FOR CORE-SHELL IMPACT MODIFIERS AND IMPACT MODIFIED THERMOPLASTIC COMPOSITION WITH ENHANCED HYDROLYTIC RESISTANCE

(75) Inventors: Christophe Navarro, Bayonne (FR); Stephane Girois, Norfolk, VA (US); Elisabeth Bay, Hagetmau (FR); Jean-Claude Saint-Martin, Escondeaux (FR)

(73) Assignee: Arkema France, Colombes (FR)

( * ) Notice: Subject to any disclaimer, the term of this patent is extended or adjusted under 35 U.S.C. 154(b) by 199 days.

This patent is subject to a terminal disclaimer.

(21) Appl. No.: 13/325,762

(22) Filed: Dec. 14, 2011

(65) Prior Publication Data
US 2012/0157601 A1    Jun. 21, 2012

(30) Foreign Application Priority Data

Dec. 15, 2010   (FR) .................................. 10 60582

(51) Int. Cl.
| | | |
|---|---|---|
| C08L 51/00 | (2006.01) |
| C08F 285/00 | (2006.01) |
| C08F 2/22 | (2006.01) |
| C08F 6/00 | (2006.01) |
| C08F 6/22 | (2006.01) |
| C08F 279/06 | (2006.01) |
| C08L 67/02 | (2006.01) |
| C08L 69/00 | (2006.01) |

(52) U.S. Cl.
CPC ................. *C08F 285/00* (2013.01); *C08F 2/22* (2013.01); *C08F 6/006* (2013.01); *C08F 6/22* (2013.01); *C08F 279/06* (2013.01); *C08L 51/003* (2013.01); *C08L 67/02* (2013.01); *C08L 69/00* (2013.01)

(58) Field of Classification Search
CPC ....................................................... C08L 51/003
USPC ............................................................ 523/201
See application file for complete search history.

(56) References Cited

U.S. PATENT DOCUMENTS

| | | | |
|---|---|---|---|
| 3,287,443 A | 11/1966 | Saito at al. | |
| 3,657,391 A | 4/1972 | Curfman | |
| 3,808,180 A | 4/1974 | Owens | |
| 3,985,704 A | 10/1976 | Jones et al. | |
| 4,096,202 A | 6/1978 | Farnham et al. | |
| 4,180,494 A | 12/1979 | Fromuth et al. | |
| 4,260,693 A | 4/1981 | Liu | |
| 4,299,928 A | 11/1981 | Witman | |
| 4,897,462 A | 1/1990 | Yusa et al. | |
| 5,373,060 A * | 12/1994 | Guentherberg et al. | 525/301 |
| 5,514,772 A | 5/1996 | Suzuki et al. | |

(Continued)

FOREIGN PATENT DOCUMENTS

WO   WO2006/057777   6/2006

*Primary Examiner* — Vickey Nerangis
(74) *Attorney, Agent, or Firm* — Lynn B. Morreale

(57) ABSTRACT

The present invention relates to a process for producing impact modifiers, impact modified thermoplastic molding compositions and in particular impact modified polycarbonate or polycarbonate/polyester blends having improved resistance to degradation. More particularly the present invention relates to a process for producing polymeric impact modifiers with a core-shell structure made by a multistage process comprising a control and adjustment if necessary of the pH value before and during the recovery step.

19 Claims, 1 Drawing Sheet

(56) References Cited

U.S. PATENT DOCUMENTS

| | | |
|---|---|---|
| 5,534,594 A | 7/1996 | Troy et al. |
| 5,536,840 A | 7/1996 | Lamm et al. |
| 5,773,320 A | 6/1998 | Bayerer |
| 6,545,089 B1 | 4/2003 | DeRudder et al. |
| 2003/0203990 A1 | 10/2003 | DeRudder et al. |
| 2004/0102564 A1 | 5/2004 | Guntherberg et al. |
| 2009/0062448 A1 | 3/2009 | DeArmitt et al. |
| 2009/0149600 A1 | 6/2009 | Ness |
| 2009/0239991 A1 | 9/2009 | Avtomonov et al. |
| 2009/0253719 A1 | 10/2009 | Pimplaskar et al. |
| 2009/0253720 A1 | 10/2009 | Roberts et al. |
| 2010/0004398 A1 | 1/2010 | Wang et al. |
| 2012/0157628 A1* | 6/2012 | Navarro et al. .......... 525/66 |
| 2012/0157629 A1* | 6/2012 | Navarro et al. .......... 525/67 |
| 2012/0157630 A1* | 6/2012 | Navarro et al. .......... 525/67 |

\* cited by examiner

Figure 1 –
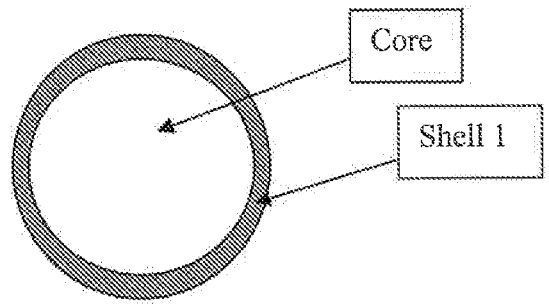
Figure 2 a –
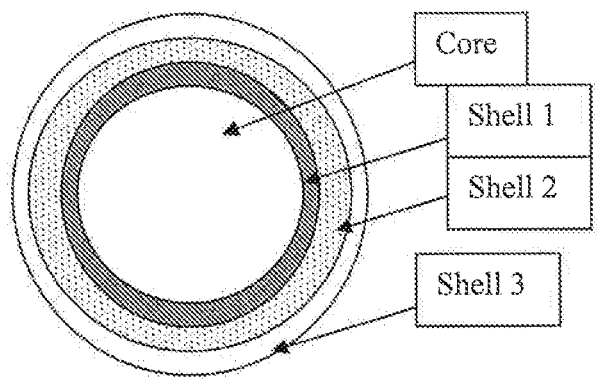
Figure 2 b
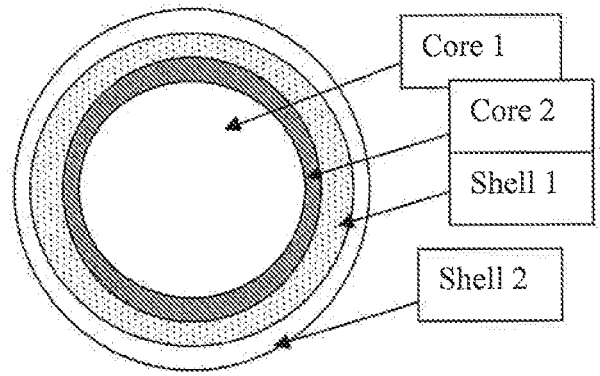
Figure 3
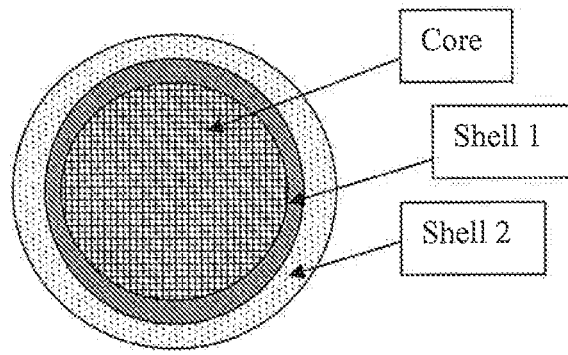

PROCESS FOR CORE-SHELL IMPACT MODIFIERS AND IMPACT MODIFIED THERMOPLASTIC COMPOSITION WITH ENHANCED HYDROLYTIC RESISTANCE

FIELD OF THE INVENTION

The present invention relates to a process for producing impact modifiers, impact modified thermoplastic molding compositions and in particular impact modified polycarbonate or polycarbonate/polyester blends having improved resistance to degradation.

More particularly the present invention relates to a process for producing polymeric impact modifiers with a core-shell structure made by a multistage process comprising a control and adjustment if necessary of the pH value before and during the recovery step.

TECHNICAL PROBLEM

Impact modifiers are widely used to improve the impact strength for thermoplastics and thermosets with the aim to compensate their inherent brittleness or the embrittlement that occurs at ambient or sub zero temperatures, notch sensitivity and crack propagation. So an impact modified polymer is a polymeric material whose impact resistance and toughness have been increased by the incorporation of micro domains of a rubbery material. This is usually done due to the introduction of sub microscopic rubber particles into the polymer matrix that can absorb the impact energy or dissipate it. One possibility is to introduce the rubber particles in form of core-shell particles. These core-shell particles that possess very generally a rubber core and a polymeric shell, having the advantage of a proper particle size of the rubber core for effective toughening and the grafted shell in order to have the adhesion and compatibility with the thermoplastic matrix.

The performance of the impact modification is a function of the particles size, especially of the rubber part of the particle, and its quantity. There is an optimal average particle size in order to have the highest impact strength for a given quantity of added impact modifier particles.

These primary impact modifier particles are usually added in form of powder particles to the thermoplastic material. These powder particles consist of the agglomerated primary impact modifier particles. During the blending of the thermoplastic material with the powder particles, the primary impact modifier particles are regained and are dispersed, more or less homogenously, in the thermoplastic material.

While the particle size of the impact modifier particles is in the range of nanometers, the range of the agglomerated powder particles is in the range of micrometers.

Agglomeration during the recovery can be obtained by several processes, as for example, spray drying, coagulation or freeze drying or combination of spray drying and coagulation techniques.

It important to have an impact modifier powder that has no negative influence on the thermoplastic polymer. As negative influence, it is understood, for example the color stability, the thermal stability, the hydrolysis stability of the thermoplastic polymer comprising the impact modifier, either on function of the time or the temperature or both. All these influences might occur due to the architecture of the core-shell but more particularly the impurities and side products employed during the synthesis and treatment of the impact modifier powder. Usually, there is no special purification step of the impact modifier, just a separation of solid versus liquid. Therefore more or less important quantities of any chemical compound (impurities, by-products) employed are still incorporated in the impact modifier. These chemical compounds should not influence the thermoplastic material in a major way as for example degradation of optical and/or mechanical and/or rheological properties with time and/or temperature and/or hygrometry.

It is also, as well important, to separate the impact modifier from the reaction medium in the easiest way, meaning essentially the use of less of resources as possible. As resources can be seen equipment involved, energy, and more generally utilities and any products.

An objective of the invention is to have a fast simple, efficient and economical process to synthesize the impact modifier and separate it from the reaction medium without further purifying and unnecessary washing steps.

Objective of the invention is to reduce waste water and cut down utilities, especially energy cost and capital investment for equipment involved in the separation.

Still another objective of the invention is to have a process for making an impact modifier that once the impact modifier is incorporated in thermoplastic composition, that the composition has a good compromise between all the properties of the impact modified thermoplastic polymer as having high impact strength, while not reducing the viscosity of the polymer composition and color change at elevated temperatures, due to the influence of impurities or by-products used during the preparation of the impact modifier.

A further objective of the invention is to have thermoplastic composition containing an impact modifier that has a good compromise between all the properties of the impact modified thermoplastic polymer as having high impact strength, while not reducing the viscosity of the polymer composition and color change at elevated temperatures, due to the influence of impurities or by-products used during the preparation of the impact modifier.

BACKGROUND OF THE INVENTION

Synthesis and processes of core shell impact modifiers and impact modified thermoplastic compositions are well known.

The document U.S. Pat. No. 5,514,772 describes a method for producing powdery and granular polymers. The method includes two coagulation steps: coagulating a latex of the polymer, the latex containing a sulfuric acid ester series and/or sulfonic acid series anionic surface active agents, with an acid to an amount of the polymer of 40 to 80 weight percent at a first coagulation step, and then bringing coagulation to completion with an acid or salt at a second coagulation step. A powder with a sharp particle size distribution is obtained. The process described involves four vessels and the pH is always below 3.

The document U.S. Pat. No. 4,897,462 describes a slow coagulation process in a pH range from 2 to 6 during the coagulation, followed by a fast completion of the coagulation at a pH<2, in order to obtain a spherical powder without fine particles. This slow coagulation is achieved due to addition of salt in diluted concentrations meaning a large amount of water.

WO2006/057777 describes the synthesis of core-shell MBS particles by emulsion graft polymerization. The polymer particles are coagulated with sulfuric acid and further heated up to 85° C.

WO 2009/126637 describes functional MBS impact modifiers synthesized by a multistage emulsion polymerization. At the end the reaction mixture obtained is coagulated in order to separate the polymer. The coagulating treatment is performed by bringing into contact the reaction mixture with a saline solution (calcium chloride or aluminum chloride —$CaCl_2$ or $AlCl_3$) or a solution acidified with concentrated sulfuric acid and then to separate, by filtration, the solid product resulting from the coagulating, the solid product then being washed and dried to give a graft copolymer as a powder.

The document EP 0900 827 describes emulsion grafted polymers, and especially MBS core-shell polymers. Which are substantially, free from components that degrade the thermoplastic polymer, in that case polycarbonate. Therefore such components are omitted during the synthesis. More generally in order to increase the thermal stability of the impact modified polycarbonate any basic compound has to avoided during the synthesis of the impact modifier. It is especially insisted on the use of a certain class of surfactants during the emulsion polymerization, especially sulfate- and sulfonate-containing surfactants.

All prior art is generally silent about such process details of synthesis of the core-shell impact modifier especially its pH at the end of the synthesis, the pH before and during the recovery process and choice of electrolyte and the performance of such an impact modifier in a thermoplastic composition.

BRIEF DESCRIPTION OF THE INVENTION

Surprisingly it has also been discovered that the pH value during the precipitation agglomeration step is important for the coagulation and the performance of the product in the thermoplastic resin. It could be not sufficient to have a certain pH for the final product, but already respect a certain pH during the recovery step. The nature of the species (either acidic or basic) used to control the pH is also important for the performance of the product in the thermoplastic resin.

It has also been found that a compromise in choosing the conditions during the synthesis and agglomeration yields to a better performance of the impact modified thermoplastic resin, especially a good compromise between impact strength, yellowing, resistance to hydrolysis and melt stability.

Surprisingly it has also been discovered that the structure of the core-shell impact modifier is of importance, particularly having an intermediate shell that contains a gradient polymer.

BRIEF DESCRIPTION OF THE DRAWINGS

The FIGS. 1 to 3 are examples for core-shell structures

FIG. 1: Core-shell particle consisting of a core and one shell

FIG. 2 a: Core-shell particle consisting of a core and three shells, the gradient shell can be shell 1 or shell 2

FIG. 2 b: Core-shell particle consisting of a core 1 and three layers core 2, shell 1 and shell 2, the gradient shells are core 1 and shell 2

FIG. 3: Core-shell particle consisting of a core and two shells, the gradient shell is shell 1

DETAILED DESCRIPTION OF THE INVENTION

In a first aspect, the present invention relates to a process for producing an impact modifier comprising following steps
 a) synthesis of a core shell copolymer latex by emulsion polymerization
 b) control and adjusting of pH value of the core shell polymer particle after the synthesis step
 c) coagulation of the core shell polymer at a pH between 4 and 8 by addition of an aqueous electrolyte solution.

In a second aspect the present invention relates to a thermoplastic molding composition comprising one thermoplastic polymer and a core-shell impact modifier obtained by such a process.

By the term "impact modifier" as used is denoted a compound comprising an elastomer or rubber that can be added or incorporated in a thermoplastic compound to improve its impact resistance.

By the term "rubber" as used is denoted the thermodynamic state of the polymer above its glass transition.

By the term "alkyl(meth)acrylate" as used is denoted the to both alkyl acrylate and alkyl methacrylate.

By the term "copolymer" as used is denoted that the polymers consists of at least two different monomers.

By the term "gradient polymer" used is denoted a copolymer that has gradient in repeat units arranged from mostly monomer A to mostly monomer B along much or all of the copolymer chain.

By "multistage polymer" as used is denoted a polymer formed in sequential fashion by a multi-stage emulsion polymerization process with at least two stages that are different in composition. Preferred is a multi-stage emulsion polymerization process in which the first polymer is a first-stage polymer and the second polymer is a second-stage polymer, i.e., the second polymer is formed by emulsion polymerization in the presence of the first emulsion polymer.

By the term core-shell polymer as used is denoted a polymers having structures for example as shown in FIGS. 1-3, but not limited there to.

By the term "particle size" as used is denoted the volume average diameter of a particle considered as spherical as measured by light diffusion using laser spectrometry.

By the term "parts" as used herein is denoted "parts by weight". Unless otherwise stated, "total parts by weight" do not necessarily add to 100.

By the term "neutral pH" as used herein is denoted a pH from 6.0 to 7.5.

With regard to the core-shell copolymer, this is in the form of fine particles having a rubber core and at least one thermoplastic shell, the particle size being generally less than 1 μm and advantageously between 50 nm and 500 nm, preferably between 100 nm and 400 nm, and most preferably 150 nm and 350 nm, advantageously between 170 nm and 350 nm.

The core-shell particle has preferably more than one shell. At least the outer shell, in contact with the thermoplastic matrix, has a glass transition temperature (Tg) greater then 25° C., preferably greater then 50° C.

The core-shell impact modifier is prepared by emulsion polymerization. For example a suitable method is a two-stage polymerization technique in which the core and shell are produced in two sequential emulsion polymerization stages. If there are more shells another emulsion polymerization stage follows.

The core-shell ratio is not particularly limited, but preferably in a range in weight between 10/90 and 90/10, more preferably 40/60 and 90/10, advantageously 60/40 to 90/10 and most advantageously between 70/30 and 85/15.

With regard to the core according to the invention, this is a rubber polymer. The glass transition temperature (Tg) of the rubber core is less then 0° C., preferably less then −10° C., advantageously less then −20° C. and most advantageously less then −25° C. and more most advantageously less then −40° C.

Preferably the rubber core has a glass transition temperature between −120° C. and −10° C. and more particularly between −90° C. and −40° C., preferably between −80° C. and −40° C. and more preferably between −80° C. and −50° C.

By way of example, the rubber polymer of the core, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl(meth)acrylate, or butadiene or isoprene. In a preferred embodiment the core is a butadiene homopolymer.

The core of the core-shell copolymer may be completely or partly crosslinked. All that is required is to add at least difunctional monomers during the preparation of the core; these monomers may be chosen from poly(meth)acrylic esters of polyols, such as butanediol di(meth)acrylate and trimethylolpropane trimethacrylate. Other multifunctional monomers are, for example, divinylbenzene, trivinylbenzene, and triallyl cyanurate. The core can also be crosslinked by introducing into it, by grafting or as a comonomer during the polymerization, unsaturated functional monomers such as anhydrides of unsaturated carboxylic acids, unsaturated carboxylic acids and unsaturated epoxides. Mention may be made, by way of example, of maleic anhydride, (meth)acrylic a acid and glycidyl methacrylate. The crosslinking may also be carried out by using the intrinsic reactivity of the monomers, for example the diene monomers.

The core can also be covered by a core layer. By core layer is meant that the polymer composition of that core layer has glass transition temperature (Tg) of less then 0° C., preferably less then −10° C., advantageously less then −20° C. and most advantageously less then −25° C.

The core layer is preferably a gradient polymer.

For preparing the rubber core with a diameter of 50-250 nm of the core-shell particle different processes can be used: the grow-out process, the seeded grow-out process and an agglomeration process.

Chain transfer agents are also useful in forming the core polymer. Useful chain transfer agents include those known in the art, including but not limited to ter-dodecylmercaptan, n-docdecylmercaptan, n-octylmercaptan, and mixtures of chain transfer agents. The chain transfer agent is used at levels from 0 to 2 percent by weight, based on the total core monomer content. In a preferred embodiment, 0.1 to 1 percent chain transfer agent is used in forming the core polymer.

With regard to the shell(s) according to the invention, these are styrene homopolymers, alkylstyrene homopolymers or methyl methacrylate homopolymers, or copolymers comprising at least 70 wt % of one of the above monomers and at least one comonomer chosen from the other above monomers, another alkyl(meth)acrylate, vinyl acetate and acrylonitrile. The shell may be functionalized by introducing into it, by grafting or as a comonomer during the polymerization, unsaturated functional monomers such as anhydrides of unsaturated carboxylic acids, unsaturated carboxylic acids and unsaturated epoxides. Mention may be made, for example, of maleic anhydride, (meth)acrylic acid glycidyl methacrylate, hydroxyethyl methacrylate and alkyl(meth)acrylamides. By way of example, mention may be made of core-shell copolymers having a polystyrene shell and core-shell copolymers having a PMMA shell. The shell may also contain imide functional groups, either by copolymerization with a maleimide or by chemical modification of the PMMA by a primary amine. Advantageously, the molar concentration of the imide functional groups is 30 to 60% (relative to the entire shell). There are also core-shell copolymers having two shells, one made of polystyrene and the other, on the outside, made of PMMA. Examples of copolymers and their method of preparation are described in the following patents: U.S. Pat. No. 4,180,494, U.S. Pat. No. 3,808,180, U.S. Pat. No. 4,096,202, U.S. Pat. No. 4,260,693, U.S. Pat. No. 3,287,443, U.S. Pat. No. 3,657,391, U.S. Pat. No. 4,299,928, U.S. Pat. No. 3,985,704 and U.S. Pat. No. 5,773,320.

The shell(s) may be crosslinked by adding a at least one multifunctional monomer during the preparation of the respective shell.

With regard to the gradient copolymer according to the invention, at least one layer of the core-shell particle is a copolymer of variable composition between two layers, in other words having a gradient. The polymer composition at the beginning of the gradient zone is richer in the monomer/polymer from the neighboring layer and at the end of the gradient zone the copolymer is richer in the second monomer/polymer that forms the next layer. The gradient zone between the core and a shell or between two polymer shells may be produced for example by monomers that have different copolymerization parameters or by carrying out the reaction in a semi continuous mode under starved feed conditions where the rate of the addition of the monomers is slower than is the rate of the reaction. The latter mode causes that the instantaneous copolymer composition is determined by the monomer feed composition.

The gradient polymer is never the outermost layer of the core shell particle. The monomers in the gradient polymer are chosen on function of the neighboring layers from the monomers cited with the core and the respective shells.

In a preferred embodiment the gradient polymer comprises butadiene and styrene or methyl methacrylate and styrene as monomers.

With regard to structure and the properties of the core-shell copolymer there is the polymeric core, which is a rubber, and at least the two polymeric layers where at least one of the layers comprises a gradient polymer. The physical property the young modulus of the polymeric rubber core is always less then the modulus of the other polymeric layers. The young modulus of layer comprising the gradient polymer is always less then the modulus of the outer most layer.

With regard to the production process, the core-shell impact modifier is an emulsion graft copolymer having a butadiene-based core polymer and one or more shell polymers. A graft copolymer, is obtained by graft-polymerizing a monomer or monomer mixture containing at least an aromatic vinyl, alkyl methacrylate or alkyl acrylate in the presence of a latex containing a butadiene-based rubber polymer.

Polymerization initiators useful in producing a the graft copolymer include, but are not limited to a persulfate salt such as potassium persulfate, ammonium persulfate, and sodium persulfate; an organic peroxide such as tert-butyl hydroperoxide, cumene hydroperoxide, benzoyl peroxide, lauroyl peroxide, p-menthane hydroperoxide, and diisopropylbenzene hydroperoxide; an azo compound such as azobisisobutyronitrile, and azobisisovaleronitrile; or a redox initiator. However, it is preferable to use catalytic systems of redox type formed by the combination of a peroxide compound, for example as mentioned above, with a reducing agent, in particular such as alkali metal sulfite, alkali metal bisulfite, sodium formaldehyde sulfoxylate ($NaHSO_2HCHO$), ascorbic acid, glucose, and in particular those of the said catalytic systems which are water-soluble, for example potassium persulfate/sodium metabisulfite or alternatively diisopropylbenzene hydroperoxide/sodium formaldehyde sulfoxylate or even more complicate systems as for example ferrous sulfate/dextrose/sodium pyrophosphate.

Use may be made, as emulsifying agent, of any one of the known surface-active agents, whether anionic, nonionic or even cationic. In particular, the emulsifying agent may be chosen from anionic emulsifying agents, such as sodium or potassium salts of fatty acids, in particular sodium laurate, sodium stearate, sodium palmitate, sodium oleate, mixed sulphates of sodium or of potassium and of fatty alcohols, in particular sodium lauryl sulphate, sodium or potassium salts of sulphosuccinic esters, sodium or potassium salts of alkylarylsulphonic acids, in particular sodium dodecylbenzenesulphonate, and sodium or potassium salts of fatty monoglyceride monosulphonates, or alternatively from nonionic surfactants, such as the reaction products of ethylene oxide and of alkylphenol or of aliphatic alcohols, alkylphenols. Use may also be made of mixtures of such surface-active agents, if necessary.

Usually the working up or recovery (meaning the isolation of the core-shell polymers from the emulsion) is carried out by means of spray drying or by means of precipitation or coagulation and separation of the dispersing water.

In the case of the present invention working up is done by means of coagulation and separation of the dispersing water. The coagulation precipitation is made with an electrolyte addition.

In the scope of the present invention chloride anion containing based electrolytes are preferably avoided, as they might pose corrosion problems.

The cation of the inorganic coagulation salt is preferably selected from group Ia, IIa and IIIa of the Periodic Table of the Elements. Sodium, potassium, calcium and magnesium are particularly preferred.

Electrolytes used as coagulation agent for the present invention are for example inorganic salts such as sodium sulfate, calcium sulfate, aluminum sulfate, sodium dihydrogenophosphate, disodium hydrogenophosphate, potassium dihydrogenophosphate, dipotassium hydrogenophosphate, calcium hypophosphite and salts of organic acids such as sodium acetate, calcium acetate, potassium formate, and calcium acetylacetonate. Inorganic salts can be used from the anhydrous or the hydrated form when it exists, as for example magnesium sulfate anhydrous or magnesium sulfate heptahydrous. Advantageously the electrolyte is chosen from inorganic salts and preferably among phosphates and sulfates anions and among sodium, potassium, magnesium and calcium cations, as for example magnesium sulfate, calcium sulfate, disodium hydrogenophosphate, potassium dihydrogenophosphate. The electrolytes are used in form of an aqueous solution of one or more thereof.

An important point is the pH value during the coagulation step. Often, the pH of the powder is adapted for the final product after the recovery as for example by coagulation. But in case of the present invention, the control of the pH already takes place before and during the coagulation step.

The pH value at the beginning and during the coagulation step should be between 4 and 8, preferably between 5 and 7.5, more preferably between 6 and 7 and advantageously between 6.7 and 7.

The coagulation takes place between at a pH from 4 to 8, preferably from 5 to 7.5, more preferably from 6 to 7.2 and advantageously from 6 to 7.

The control of the pH can be done with a pH meter. It is obvious that the pH control is not necessary if it is known by the well established reaction conditions what pH value is obtained at the end of the synthesis step. By control is also meant the knowledge and certitude that the pH is inside a certain interval at the end of the synthesis step. If the pH value before the coagulation step or recovery step is already inside the interval from 4 to 8, preferably from 5 to 7.5, more preferably from 6 to 7.2 and advantageously from 6 to 7 necessary for the coagulation step or recovery step, the pH value does not have to be necessarily adjusted.

The pH value before the recovery by agglomeration of the grafted core-shell polymer dispersion can be adjusted by processes known to the person skilled in the art, for example by addition of organic or inorganic acidic solution when the pH value is too high, or by addition of organic or inorganic alkaline solution when the pH is too low, or by addition of a buffer solution to keep the pH at a nearly constant value, within restricted variations when small quantities of acidic or alkaline compounds are added to the solution.

The alkaline solutions are preferably exempt from strong inorganic bases like NaOH, KOH, LiOH, Ca(OH)2 and more generally exempt of ammonia and most organic bases which release OH— ions due to hydrolysis instead of dissociation.

The buffer solution is an aqueous solution consisting of a mixture of a weak acid and its conjugate base or a weak base and its conjugate acid.

As example of buffer solution, one can mention, buffer of carbonic acid ($H_2CO_3$) and bicarbonate ($HCO_3^-$) present in blood plasma, to maintain a pH between 7.35 and 7.45, or citric acid and sodium citrate buffer solution, or phosphate buffers based on tri potassium phosphates, dipotassium- and monopotassium phosphates or trisodium phosphates, disodium- and monosodium phosphates or citric acid and disodium phosphate.

Preferably, phosphate buffer solutions are used in the present invention and more preferably, phosphate buffer solution prepared to be able to keep pH value between 6 and 7.

The coagulation is carried out at temperatures of from 5° C. to 100° C., preferably from 10° C. to 100° C., particularly preferably from 15° C. to 100° C. advantageously from 20° C. to 90° C.

The latex coming from the synthesis used for the coagulation has a solid content between 15% and 60% in weight and preferably between 25% and 50%. The aqueous solution of the electrolyte contain concentrations in salt small enough to insure solubility of the species, taking into account their solubility constant in water at 25° C.

The separation of the coagulated and precipitated polymer and the water can take place by conventional methods for example sieving, filtration, decantation or centrifugation or combination of some of them. After separating off the dispersing water, a moist grafted polymer is obtained, which usually has residual water content of up to 75 wt %.

By the process according to the invention there is only partial separation of the auxiliary substances, such as, for example, emulsifiers, decomposition products of the radical formers, buffer substances, so that a considerable portion of up to 100% of the auxiliary substances remains in the graft polymer and consequently in the end product, that is to say the moist grafted polymer.

As there is no further purification step, all byproducts and impurities that will not part with the water will rest in the core-shell polymer powder.

With regard to the recovery process the pH of the latex of the core-shell copolymer particle before the coagulation step is between 4 and 7.5 preferably between 6 and 7. Preferably the pH of the coagulation step c) is between 6 and 7. The pH value of step b) is at is adjusted by addition of an aqueous buffer solution, preferably an aqueous phosphate buffer solution.

If the pH value before the coagulation step is far outside (at least 1 pH unity) of the pH interval, it is possible to add only one component for the buffer of the aqueous buffer solution, either the proton donor or the proton acceptor. The pH value of the latex causes that some of the buffer component will be protonated or deprotonated with the result of establishing the buffer equilibrium. For instance trisodium phosphate may be added to a latex having a pH<3, the phosphate is protonated to give hydrogenphosphate or/and dihydrogenphosphate and the buffer is produced.

Preferably the electrolyte used for coagulation in step c) is magnesium sulfate

In a preferred embodiment the recovery process comprises an additional step after the coagulation: adjusting of pH value of the core shell polymer after the coagulation step between 6 and 7.5.

The adjustment of the pH after coagulation can be made by electrolytes as solution of for example inorganic salts such as sodium sulfate, calcium sulfate, sodium dihydrogenophosphate, disodium hydrogenophosphate, potassium dihydrogenophosphate, dipotassium hydrogenophosphate, calcium hypophosphite. Inorganic salts can be used from the anhydrous or the hydrated form when it exists, as for example magnesium sulfate anhydrous or magnesium sulfate heptahydrous. Advantageously the electrolyte is chosen from inorganic salts and preferably among phosphates and sulfates anions and among sodium, potassium, magnesium and calcium cations, as for example magnesium sulfate, calcium sulfate, disodium hydrogenophosphate, potassium dihydrogenophosphate. The electrolytes are used in form of an aqueous solution of one or more thereof.

Strong inorganic bases like NaOH, KOH, LiOH, Ca(OH)2 and more generally ammonia and most organic bases which release OH— ions due to hydrolysis have to be avoided.

An antioxidant can be added. As antioxidant, products from Ciba, Clariant or Songnox companies are well known to be added to stabilize polymers.

An antiblocking agent can be added. Inorganic salts like calcium carbonates or silica can be used. Silica is preferred.

Still another aspect of the invention is an impact modified thermoplastic composition comprising at least one thermoplastic polymer and a core-shell copolymer impact modifier particle as described before or obtained by process as described before.

With regard to the thermoplastic polymer that is part of the thermoplastic composition according to the invention it can be chosen among but not limited to, poly(vinyl chloride) (PVC), polyesters as for example poly(ethylene terephtalate) (PET) or poly(butylene terephtalate) (PBT) or polylactic acid (PLA), polystyrene (PS), polycarbonates (PC), polyethylene, poly(methyl methacrylate)s (meth)acrylic copolymers, thermoplastic poly(methyl methacrylate-co-ethylacrylates), poly (alkylene-terephtalates), poly vinylidene fluoride (PVDF), poly(vinylidenchloride) (PVDC), polyoxymethylen (POM), semi-crystalline polyamides, amorphous polyamides, semi-crystalline copolyamides, amorphous copolyamides, polyetheramides, polyesteramides, copolymers of styrene and acrylonitrile (SAN), and their respective mixtures. According to a preferred embodiment the thermoplastic resin composition comprises polycarbonate (PC) and/or polyester (PET or PBT) or PC or polyester alloys. The alloys for example may be PC/ABS poly(Acrylonitrile-co-butadiene-co-styrene), PC/polyester or PC/PLA just to mention a few.

With regard to the constituents of the composition, the proportions between the core-shell polymer of the invention and the thermoplastic polymer are between 0.5/99.5 and 20/80, preferably between 2/98 and 15/75.

Methods

Estimation of the particle size of the initial impact modifiers at the end of the emulsion polymerization is performed by capillary hydrodynamic fractionation (CHDF).

For the estimation of weight average powder particle size, particle size distribution and ratio of fine particles, a Malvern Mastersizer S apparatus with a 300 mm lenses, measuring a range from 0.5-880 µm is used.

$D(v, 0.5)$ is the particle size at which 50% of the sample has size less then and 50% of the sample have a size larger then that size, or in other words the equivalent volume diameter at 50% cumulative volume. This size is also known as volume medium diameter that is related to the mass median diameter by the density of the particles by the density of the particles assuming a size independent density for the particles.

$D(v, 0.1)$ is the particle size at which 10% of the sample is smaller then that size, or in other words the equivalent volume diameter at 10% cumulative volume.

$D(v, 0.9)$ is the particle size at which 90% of the sample are smaller then that size.

$D[4,3]$ is the volume average diameter.

The Span is expressing the width of the particle size distribution. The smaller the parameter is the smaller the particle size distribution is.

The norm 9276-1 "Presentation of results of particle size analysis part 1: graphical representation" and the norm 9276-2 "Presentation of results of particle size analysis part 2: Calculation of average particle sizes/diameters and moments from particle size distribution" are used.

Procedure to Obtain the pH of the Final Powder:

5 g of dried powder are dispersed in 20 mL, of demineralised water under stirring during 10 min. at 45° C. Then, the slurry is filtrated on a Wattman filter in paper. The pH of the filtrated water is measured at room temperature.

The pH value is obtained using a Fisher Scientific glass probe connected to an Eutech Instrument pH 200 series pH-meter preliminary calibrated with standard buffer solutions.

Preparation of impact modified compositions, the respective impact modifier powders are mixed with the thermoplastic resin polycarbonate LEXAN ML5221 from SABIC (at 5 wt % with the help of an extruder type Clextral (double diameter 25 mm, length 700 mm) using temperatures between from 100° C. up to 320° C. depending on the respective zones throughout the whole extruder.

The impact strength of the thermoplastic composition is measured in accordance with the norm ISO 180-2000. Test specimen are Type 1A.

In the following examples the melt flow index (MVI) of the polymeric composition is measured in accordance with ISO-1333-2005 at 300° C. using a 2.16 kg load. Samples were prepared.

The MVI change is expressed in percentage of change from the prepared sample at 300° after 25 min compared to the value after 6 min. As the polymer composition degrades the MVI value at 25 min is larger then the value at 6 min. In case of the present invention the limit of the relative MVI change is considered as acceptable if the relative change of the MVI value is less then 20%. This is to be understood by not decreasing importantly the viscosity of the polymer composition.

The color change is observed by measuring the parameter b*. The b* value is used to characterize the principal yellowing off the samples. The b* value measures the blue and the yellow of the colour. Colours tending toward the yellow have a positive b* value while those tending toward the blue have a negative b* value. The b* values is measured using a colorimeter (especially according to the ASTM E 308 standard).

If the initial color is close to zero it is considered that the thermoplastic composition comprising the impact modifiers of the invention is acceptable. The b* should not larger then 4.

The colour change is observed as a function of time under different conditions: samples kept at 120° C. and samples kept at 90° C. and 95% humidity.

EXAMPLES

As commercial products the following product was tested as well: PARALOID EXL2691A is an MBS impact modifier from ROHM and HAAS.

Example 1

Of a Latex According to FIG. 1

First Stage: Polymerization of Core

To a 20 liters high-pressure reactor was charged: de-ionized water 116.5 parts, emulsifier potassium salt of beef tallow fatty acid 0.1 part, 1,3-butadiene 21.9 parts, t-dodecyl mercaptan 0.1 parts, and p-menthane hydroperoxide 0.1 parts as an initial kettle charge, as outlined below. The solution was heated, with agitation, to 43° C. at which time a redox-based catalyst solution was charged (water 4.5 parts, sodium tetrapyrophosphate 0.3 parts, ferrous sulfate 0.004 parts and dextrose 0.3 parts), effectively initiating the polymerization. Then the solution was further heated to 56° C. and held at this temperature for a period of three hours.

Three hours after polymerization initiation, a second monomer charge (77.8 parts BD, t-dodecyl mercaptan 0.2 parts), one-half of an additional emulsifier and reductant charge (de-ionized water 30.4 parts, emulsifier potassium salt of beef tallow fatty acid 2.8 parts, dextrose 0.5 parts) and additional initiator (p-menthane hydroperoxide 0.8 parts) were continuously added over eight hours. Following the completion of the second monomer addition, the remaining emulsifier and reductant charge plus initiator was continuously added over an additional five hours.

Thirteen hours after polymerization initiation, the solution was heated to 68° C. and allowed to react until at least twenty hours had elapsed since polymerization initiation, producing polybutadiene rubber latex, R1.

The resultant polybutadiene rubber latex (R1) contained 38% solids and had a average particle size of about 170 nm.

Second Stage: Polymerization of Shell 1 (Outer Shell)

Into a 3.9 liters reactor was charged 75.0 parts, on a solids basis, of polybutadiene rubber latex R1, 37.6 parts de-ionized water, and 0.1 parts sodium formaldehyde sulfoxylate. The solution was agitated, purged with nitrogen, and heated to 77° C. When the solution reached 77° C., a mixture of 22.6 parts methyl methacrylate, 1.1 parts ethyl acrylate, 1.4 parts divinyl benzene and 0.1 parts t-butyl hydroperoxide initiator was continuously added over 70 minutes, followed by a hold period of 80 minutes. Thirty minutes after the onset of the hold period, 0.1 parts of sodium formaldehyde sulfoxylate and 0.1 parts t-butyl hydroperoxide were added to the reactor at once.

Following the 80-minute hold period, a stabilization emulsion was added to the graft copolymer latex. The stabilization emulsion was prepared by mixing 5.4 parts deionized water (based on graft copolymer mass), 0.1 parts dodecyl benzene sulfonic acid, 0.1 parts dilauryl thiodipropionate, and 0.24 parts triethyleneglycol-bis[3-(3-t-butyl-4-hydroxy-5-methylphenyl)-propionate].

The resultant core shell latex (E2) had a average particle size of about 180 nm.

Example 2

According to the Invention of a Latex According to FIG. 2b

First Stage: Polymerization of Core 1 and Core 2

To a 20 liters high-pressure reactor was charged: de-ionized water 116.5 parts, emulsifier sodium salt of dodecyl benzene sulfonic acid 0.1 parts, 1,3-butadiene 20 parts, t-dodecyl mercaptan 0.1 parts, and p-menthane hydroperoxide 0.1 parts as an initial charge. The solution was heated, with agitation, to 43° C. at which time a redox-based catalyst solution was charged (water 4.5 parts, sodium tretrapyrophosphate 0.3 parts, ferrous sulfate 0.004 parts and dextrose 0.3 parts), effectively initiating the polymerization. Then the solution was further heated to 56° C. and held at this temperature for a period of three hours.

Three hours after polymerization initiation, a second monomer charge (71 parts BD, t-dodecyl mercaptan 0.2 parts), additional emulsifier and reductant charge (deionized water 30.4 parts, emulsifier sodium salt of dodecyl benzene sulfonic acid 0.9 parts, dextrose 0.5 parts) and additional initiator (p-menthane hydroperoxide 0.8 parts) were continuously added over eight hours. Following the completion of the second monomer addition, the remaining emulsifier and reductant charge plus initiator was continuously added over an additional five hours.

Thirteen hours after polymerization initiation, the solution was heated to 68° C., additional initiator (p-menthane hydroperoxide 0.09 parts) and Styrene (0.9 parts) were continuously added during additional 3 hours, and allowed to react until at least twenty hours had elapsed since polymerization initiation, producing butadiene core1-BD/ST gradient core2 latex (R2).

The resultant polybutadiene rubber latex (R2) contained 40.3 wt % solids and had a average particle size of about 180 nm.

Second Stage: Polymerization of Shell 1 and Shell 2

Into a 3.9 liters reactor was charged 80.75 parts, on a solids basis, of polybutadiene rubber latex R2, 1.3 parts de-ionized water, and 0.004 parts sodium formaldehyde sulfoxylate. The solution was agitated, purged with nitrogen, and heated to 55° C. When the solution reached 62° C., continuously during 60 minutes 7.1 part of styrene, 0.09 parts of divinyl benzene and 0.03 part of t-butyl hydroperoxide are added. Afterwards the temperature is increased to 75° C. for 40 minutes. In batch, a mixture of 1.4 parts de-ionized water, 0.003 parts sodium formaldehyde sulfoxylate is added, then continuously 10.5 parts methyl methacrylate, 0.13 parts de divinyl benzene and 0.04 parts t-butyl hydroperoxide initiator were added over 30 minutes. Thirty minutes after the previous addition 0.1 parts t-butyl hydroperoxide were added to the reactor at once, followed by a hold period of 60 minutes.

Following the 60-minute hold period, a stabilization emulsion was added to the graft copolymer latex. The stabilization emulsion was prepared by mixing 5.4 parts de ionized water (based on graft copolymer mass), 0.1 parts sodium salt of dodecyl benzene sulfonic acid, 0.1 parts dilauryl thiodipropionate, and 0.24 parts triethyleneglycol-bis[3-(3-t-butyl-4-hydroxy-5-methylphenyl)-propionate].

The resultant core shell latex (E2) had an average particle size of about 190 nm.

Buffer Solution for Adjusting the pH Before the Coagulation

In a 2 liters calibrated flask are added 9.45 g $Na_2HPO_4$ (disodium hydrogen phosphate) and 9.06 g $KH_2PO_4$ (potassium dihydrogen phosphate) and is completed to 2 liters with demineralized water. The pH is measured at 6.8 (0.066 mol/l)

Examples of Coagulation

In a jacketed vessel of 3 L, equipped with a stirrer is put successively 500 g of latex of core-shell particles from comparative example 1 or example 2 respectively and buffer solution at pH=6.8 for having a solid content of 14.1%. Under stirring at 300 r/min., the heat the solution is raised at 30° C. and then injected the solution of salt (16.1 g of magnesium sulphate in 300 mL of demin. water). Coagulation occurs very rapidly. After 15 min., at 30° C. under stirring, the temperature is increased up to 80° C. and maintained for further 30 min. at this temperature. Then is cooled down to 40° C. The pH is measured and adjusted if necessary with aqueous solution, of Na2HPO4 at 0.066 mol/l for being between 6 and 7.5. The slurry is filtrated on Buchner paper filter and the powder is recovered. The powder is put in a ventilated oven during 48 h at 50° C. and recovered after complete drying.

Comparative Example 3 coagulation without pH adjusting at the end. Example 2 is coagulated with magnesium sulphate without adjustment of pH to neutral value with aqueous solution of Na2HPO4 after coagulation.

Comparative Example 4 adjusting pH by NaOH after coagulation—Example 2 is coagulated with magnesium sulphate and the pH is adjusted with aqueous solution of sodium hydroxide (NaOH) instead of Na2HPO4 after coagulation.

TABLE 1 recovering conditions by coagulation

|  | Coagulating agent | pH adjustment at the end to obtain neutral pH |
|---|---|---|
| Example 1 | Magnesium sulfate | No |
| According to example 6 of WO2006/057777 | Diluted Sulfuric acid. | No |
| Comparative Example 3 | Magnesium sulfate | No |
| Comparative example 4 | Magnesium sulfate | Yes, with diluted NaOH |
| Example 2 | Magnesium sulfate | Yes, with Na2HPO4 solution |

TABLE 2 optical properties expressed by b* of impact modified PC composition

|  | b* initial | b* after 4 days at 120° C. |
|---|---|---|
| Example 1 | −1.1 | 5.7 |
| According to example 6 of WO2006/057777 | −1.9 | 5.7 |
| Comparative Example 3 | −1.2 | 18.7 |
| Comparative example 4 | −0.5 | 29.0 |
| Example 2 | −2.4 | 2.3 |

It can be seen from the examples, that with the process described by the present invention, it's possible to achieve modified PC with good initial b* and keeping low b* values versus time after aging at 12° C.

With comparative example 3, it can be seen that if final pH value is not controlled and adjusted at neutral pH, the initial b* can be acceptable but the evolution of the colour is increasing much faster with time than the products made according to the conditions of the present invention.

With comparative example 4, it can be seen that if final pH value is controlled and adjusted at neutral pH, but with a non adequate electrolyte, initial b* can be acceptable but the evolution of the colour is increasing much faster with time than the products made according to the conditions of the present invention.

TABLE 3

Izod Impact strength of impact modified polycarbonate composition

|  | IZOD impact strength [kj/m2] at | |
|---|---|---|
|  | 23° C. | −20° C. |
| Example 1 | 39.4 | 16.6 |
| According to example 6 of WO2006/07777 | 43.8 | 23.9 |
| PC with 5 wt % EXL2691A | 36.2 | 8.2 |
| Example 2 | 35.3 | 17.4 |

It can be seen from the examples in table 3, that with the process described by the present invention, it's possible to achieve modified PC with good impact resistance at room temperature and at low temperature.

TABLE 4

Delta MVI of impact modified polycarbonate composition

|  | Delta MVI(%) |
|---|---|
| PC (without core shell impact modifier) | 18.2 |
| Example 1 | 15.4 |
| According to example 6 of WO2006/057777 | 14.2 |
| Comparative Example 3 | 14.8 |
| Comparative example 4 | 34.6 |
| Example 2 | 0.3 |

It can be seen from the examples in table 4 that with the structure and process described by the present invention, its possible to achieve modified PC with good impact resistance and without degradation of its MVI versus time in contrary to PC modified with comparative products not recovered under the operating process conditions of the present invention.

What is claimed is:
1. A thermoplastic polymer composition comprising
    a) one thermoplastic polymer, and
    b) a core-shell impact modifier obtained by a process comprising the steps of:
        i) synthesizing a core-shell copolymer latex by emulsion polymerization;
        ii) controlling and adjusting of pH value of the core shell polymer particle after the synthesis step;
        iii) coagulation of the core shell polymer at a pH between 4 and 8 by addition of an aqueous electrolyte solution,
    whereby said resulting core-shell impact modifier comprises a polymeric core and at least two polymeric layers surrounding said core, each layer having a different polymer composition from the other layer and, wherein at least one polymeric layer comprises a polymer that is a gradient polymer, said gradient polymer being a copolymer consisting of at least two different monomers (A) and (B) and having a gradient in repeat units arranged from mostly said monomer (A) to mostly said monomer (B) along the copolymer.

2. The thermoplastic polymer composition comprising according to claim 1, wherein the thermoplastic polymer is chosen from poly(vinyl chloride) (PVC), polyesters, poly(ethylene terephtalate) (PET), poly(butylene terephtalate) (PBT), polylactic acid (PLA), polystyrene (PS), polycarbonates (PC), polyethylene, poly(methyl methacrylate), (meth)acrylic copolymers, thermoplastic poly(methyl methacrylate-co-ethylacrylates), poly(alkylene-terephtalates), polyvinylidene fluoride, poly(vinylidenchloride), polyoxymethylene (POM), semi-crystalline polyamides, amorphous polyamides, semi-crystalline copolyamides, amorphous copolyamides, polyetheramides, polyesteramides, copolymers of styrene and acrylonitrile (SAN), and mixtures thereof.

3. The thermoplastic polymer composition according to claim 1, wherein the thermoplastic polymer is chosen from polycarbonate (PC) and/or polyester or polyester alloys.

4. The thermoplastic polymer composition comprising according to claim 1, wherein said core-shell impact modifier comprises at least one polymeric core and at least two polymeric shell layers, the core having a different composition from the shell layers, wherein the polymeric core comprises a layer of polymer that is a gradient polymer; wherein each shell layer has a different polymer composition from the other shell layer, and wherein at least one polymeric shell layer comprises a polymer that is a gradient polymer.

5. The thermoplastic polymer composition comprising according to claim 1, wherein the glass transition temperature of the polymeric core is under 0° C.

6. The thermoplastic polymer composition comprising according to claim 5, wherein the glass transition temperature of the polymeric core is between −80° C. and −40° C.

7. The thermoplastic polymer composition comprising according to claim 1, wherein the polymeric core comprises polybutadiene.

8. The thermoplastic polymer composition comprising according to claim 1, wherein at least one of said two polymeric layers is a core layer comprising butadiene and styrene and at least one other polymeric layer is a shell layer.

9. The thermoplastic polymer composition comprising according to claim 8, wherein the at least one other polymeric layer is a shell layer comprising methylmethacrylate.

10. The thermoplastic polymer composition comprising according to claim 1, wherein the gradient polymer comprises styrene.

11. The process according to claim 1 wherein the pH of the latex of the core-shell copolymer particle before the coagulation step is between 4 and 7.5.

12. The process according to claim 1 wherein the pH of the coagulation step iii is between 6 and 7.

13. The process s according to claim 1 wherein the pH value of step ii is adjusted by addition of an aqueous buffer solution.

14. The process according to claim 13 wherein the aqueous buffer solution is an aqueous phosphate buffer solution.

15. The process according to claim 1 wherein the electrolyte used for coagulation in step iii is magnesium sulfate.

16. The process according to claim 1 comprising an additional step iv after step iii wherein step iv is adjusting of pH value of the core shell polymer after the coagulation step between pH 6 to 7.5.

17. The process according to claim 16 wherein the adjusting of the pH of step iv is made by an aqueous electrolyte solution selected from the group of inorganic salts comprising anions chosen from phosphate and sulfate anions and cations chosen from sodium, potassium, magnesium and calcium cations.

18. The process according to claim 17 wherein said inorganic salts are selected from the group consisting of magnesium sulfate, calcium sulfate, disodium hydrogenophosphate, potassium dihydrogenophosphate, and mixtures thereof.

19. The process according to claim 1 wherein the pH of the latex of the core-shell copolymer particle before the coagulation step is between 6 and 7.

\* \* \* \* \*